UNITED STATES PATENT OFFICE 1,996,629

SECONDARY-HEPTYL ETHYL BARBITURIC ACIDS AND SALTS THEREOF

Horace A. Shonle, Indianapolis, Ind., assignor to Eli Lilly and Company, Indianapolis, Ind., a corporation of Indiana No Drawing. Application February 19, 1932, Serial No. 594,150

10 Claims. (Cl. 260—33)

This application is a continuation in part of my co-pending application Serial No. 387,084, filed August 19, 1929.

It is the main object of my invention to produce certain 5,5-di-aliphatic-substituted barbituric acids, and their salts, in which one substituent is the ethyl group, and the other substituent is a saturated open-chain secondary-aliphatic radical which has seven carbon atoms and especially those in which no two tertiary carbon atoms are directly joined, including the following groups:

A. Those in which both groups attached to the tertiary attaching-carbon atom (the carbon atom by which the secondary-aliphatic substituent is attached to the main structure) are unbranched:
  n-Amyl-methyl-carbinyl;
  n-Butyl-ethyl-carbinyl;
  Di-n-propyl-carbinyl.

B. Those in which at least one of the groups attached to the tertiary attaching-carbon atom is branched:
  Isoamyl-methyl-carbinyl;
  Isobutyl-ethyl-carbinyl;

An incidental object of my invention is to produce certain new intermediates. These are di-aliphatic-substituted malonic esters.

The new 5,5-di-aliphatic-substituted barbituric acids and their salts which are included in this present application all have pronounced hypnotic action. They are all represented by the following formula:

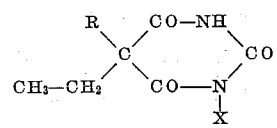

in which R represents a saturated open-chain secondary-aliphatic radical which has 7 carbon atoms and especially those in which no two tertiary carbon atoms are directly joined; and X represents either hydrogen (if the compound is an acid), or either an alkali metal, such as sodium, or ammonium, or a mono- or di-alkyl-substituted ammonium, such as —NH3—CH3 or —NH2(C2H5)2, (if the compound is a salt).

These new acids and salts are prepared from certain new di-substituted malonic esters, usually ethyl esters, which are represented by the following formula:

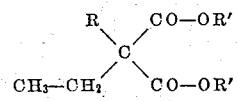

in which R, as before, represents a saturated open-chain secondary-aliphatic radical which has 7 carbon atoms and especially those in which no two tertiary carbon atoms are directly joined; and R' represents an alkyl radical having not to exceed 3 carbon atoms, namely the methyl, ethyl, and propyl radicals, and preferably the ethyl radical.

The new di-substituted malonic esters, barbituric acids, and barbiturates constitute a class the members of which have in common the radical (3) 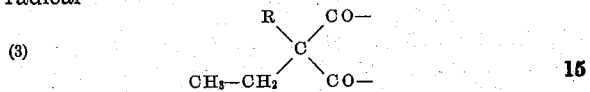

in which R, as already defined, represents a saturated open-chain secondary-aliphatic radical which has 7 carbon atoms and especially those in which no two tertiary carbon atoms are directly joined, and in which the two CO groups are joined to the chemical structure necessary to make the whole a compound of that class.

So far as I know, I am the first to produce any compound containing the radical shown in Formula 3; and my broad claims are intended to cover such compounds generally.

*Secondary-heptyl ethyl malonic esters*

A. Those in which both groups attached to the attaching-carbon atom of the secondary heptyl radical are unbranched:

1. Di-n-propyl-carbinyl ethyl malonic ester is an example of the malonic esters of Class A. It may be prepared as follows: One mole of sodium is dissolved in 10 to 12 times its weight of absolute alcohol under a reflux condenser. One mole of ethyl malonic ester is added, and then 1.1 moles of 4-bromo-heptane are gradually added. The 4-bromo-heptane may be obtained in various ways, as by refluxing di-n-propyl carbinol with HBr or by treating di-n-propyl carbinol with anhydrous gaseous HBr. The mixture of ethyl malonic ester and 4-bromo-heptane is refluxed for some hours or until it no longer shows an alkaline action to moist litmus. Most of the alcohol is removed by vacuum distillation, leaving an oily residue. Water is added to this residue to dissolve out the sodium bromide; and the oily layer, which is di-n-propyl-carbinyl ethyl malonic ester, is separated and dried. It is purified by fractional distillation in vacuo. When so purified, it is a colorless or pale yellow liquid.

It has a boiling point of between 127–133° C., corrected, at about 10 mm. pressure, if the 4- bromo-heptane used was obtained by refluxing di-n-propyl carbinol with HBr. When di-n-propyl carbinol is thus refluxed with HBr it has been found that in addition to 4-bromo-heptane there may be also formed 3-bromo-heptane and 2-bromo-heptane. Consequently the secondary-heptyl ethyl malonic ester obtained from the bromo-heptane so prepared would contain, in addition to di-n-propyl-carbinyl ethyl malonic ester, varying amounts of n-butyl-ethyl-carbinyl ethyl malonic ester and n-amyl-methyl-carbinyl ethyl malonic ester.

But 4-bromo-heptane uncontaminated by its isomers may be obtained by treating di-n-propyl carbinol with anhydrous gaseous HBr. The 4-bromo-heptane so obtained boils at about 60° C., corrected, at 18 mm. pressure. When this is caused to react with sodium ethyl malonic ester in absolute alcohol as described above, the di-n-propyl-carbinyl ethyl malonic ester so obtained, when purified by fractional distillation, has a boiling point of about 138° to 141° C., corrected, at about 8-9 mm. pressure, and a refractive index at 25° C. of about 1.4370-1.4382.

Di-n-propyl-carbinyl ethyl malonic ester is represented by the following formula:

(4) 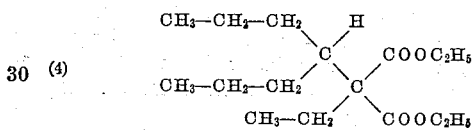

2. n-Amyl-methyl-carbinyl ethyl malonic ester is another example under Class A: n-Amyl-methyl carbinol, prepared from n-amyl bromide and acetaldehyde by the Grignard reaction, may be treated with PBr₃ or with dry gaseous HBr to form 2-bromo-heptane. By treating ethyl malonic ester with 2-bromo-heptane, in a manner analogous to that described above for preparing di-n-propyl-carbinyl ethyl malonic ester from 4-bromo-heptane, n-amyl-methyl-carbinyl ethyl malonic ester may be obtained.

3. n-Butyl-ethyl-carbinyl ethyl malonic ester is a third example under Class A: n-Butyl-ethyl carbinol may be obtained from n-butyl-bromide and propionaldehyde by the Grignard reaction. When this is treated with PBr₃ or with dry gaseous HBr, 3-bromo-heptane is obtained. By treating ethyl malonic ester with 3-bromo-heptane, in a manner analogous to that described above for preparing di-n-propyl-carbinyl ethyl malonic ester from 4-bromo-heptane, n-butyl-ethyl-carbinyl ethyl malonic ester may be obtained.

B. Those in which at least one of the groups attached to the attaching-carbon atom of the secondary-heptyl radical is branched:

4. Isoamyl-methyl-carbinyl ethyl malonic ester is an example of the malonic esters of Class B. It may be prepared analogously to di-n-propyl-carbinyl ethyl malonic ester, using 2-bromo-5-methyl-hexane. This latter compound is prepared by treating isoamyl-methyl carbinol with PBr₃. The 2-bromo-5-methyl-hexane so obtained boils at about 64-66° C., corrected, at about 25 mm. pressure. The isoamyl-methyl carbinol may be obtained by the Grignard method from isoamyl bromide and acetaldehyde, and boils at 149° to 154° C., corrected. Isoamyl-methyl-carbinyl ethyl malonic ester is a colorless or pale yellow liquid when purified by fractional distillation, having a boiling point of about 128-131° C., corrected, at about 5 mm. pressure, and a refractive index at 25° of about 1.4340–1.4355. It is represented by the following formula:

(5) 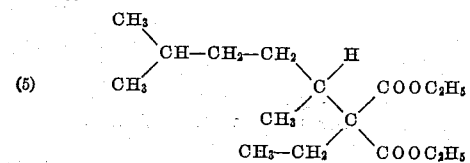

5. Isobutyl-ethyl-carbinyl ethyl malonic ester is another example under Class B. Isobutyl-ethyl carbinol is treated with PBr₃, to form the corresponding bromide, which may be called 3-bromo-5-methyl-hexane. By treating ethyl malonic ester with this bromide, in a manner analogous to that described above for preparing iso-amyl-methyl-carbinyl ethyl malonic ester from 2-bromo-5-methyl-hexane, isobutyl-ethyl-carbinyl ethyl malonic ester may be obtained. It is a high-boiling oil after suitable purification by fractional distillation.

Better yields of the above esters are usually obtained if most of the alcohol that was used to dissolve the sodium is removed, as by vacuum distillation, prior to the addition of the bromo-heptanes.

*Secondary-heptyl-ethyl barbituric acids*

Di-substituted barbituric acids corresponding to the various di-substituted malonic esters above described may be obtained, as shown by the following examples:

A. Those in which both groups attached to the attaching-carbon atom of the secondary-heptyl radical are unbranched:

1. Di-n-propyl-carbinyl ethyl barbituric acid is an example of the barbituric acids of Class A. It may be prepared as follows: 3 moles of sodium are dissolved in 10 to 12 times its weight of absolute alcohol under a reflux condenser. To these are added 1.6 moles of urea and 1 mole of di-n-propyl-carbinyl ethyl malonic ester. The mixture is gently refluxed for 12 to 15 hours, after which most of the alcohol is removed by vacuum distillation. The residue is dissolved in water, and a sufficient amount of dilute acid is added to completely precipitate the di-n-propyl-carbinyl ethyl barbituric acid. The precipitated barbituric acid is filtered off, dried, washed with gasoline, and purified by recrystallizing from dilute alcohol. It is a white crystalline solid having a melting point of about 123-131° C., corrected, depending upon the extent to which the recrystallization is carried. It is insoluble in water, readily soluble in alcohol and ether, and has a bitter taste. It is represented by the following formula:

(6) 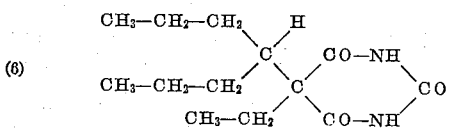

Its sodium salt is a white solid, soluble in water and alcohol but insoluble in ether. Its salts of ammonia, mono-methyl amine, and di-ethyl amine are whitish or yellowish solids, soluble in water, which tend to lose their basic component when exposed to air.

2. n-Amyl-methyl-carbinyl ethyl barbituric acid and n-butyl-ethyl-carbinyl ethyl barbituric acid are other examples under Class A. They may be prepared analogously to di-n-propyl-carbinyl ethyl barbituric acid, using n-amyl-methyl-carbinyl ethyl malonic ester and n-butyl-ethyl-carbinyl ethyl malonic ester respectively.

When purified by recrystallization from dilute alcohol, they are white crystalline solids, insoluble in water, soluble in alcohol and ether, and having a bitter taste. They are represented by the following formulas n-Amyl-methyl-carbinyl ethyl barbituric acid:

(7) 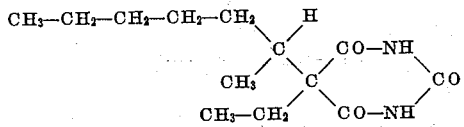

n-Butyl-ethyl-carbinyl ethyl barbituric acid:

(8) 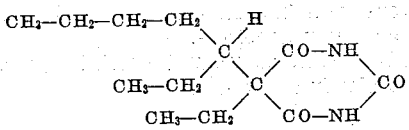

Their sodium salts are white solids, soluble in water and alcohol but insoluble in ether.

If the barbituric acids of Formulas 6, 7, and 8 are prepared from malonic esters which contain isomers, as already described for di-n-propyl-carbinyl ethyl malonic ester and as may occur with the other two malonic esters involved, the barbituric acids also contain corresponding isomers. But such mixtures of these isomeric barbituric acids have very nearly the same therapeutic effects as the separate acids.

B. Those in which at least one of the groups attached to the attaching-carbon atom of the secondary-heptyl radical is branched:

4. Isoamyl-methyl-carbinyl ethyl barbituric acid is an example of the barbituric acids of Class B. It may be prepared analogously to di-n-propyl-carbinyl ethyl barbituric acid, using isoamyl-methyl-carbinyl ethyl malonic ester. When purified by recrystallization from dilute alcohol, it is a white crystalline solid melting at about 133–136° C., corrected. It is insoluble in water, soluble in alcohol and ether, and has a bitter taste. It is represented by the following formula:

(9) 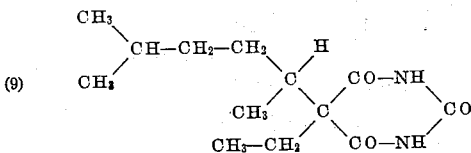

Its sodium salt is a white solid, soluble in water and alcohol but insoluble in ether.

5. In an analogous manner, by treating isobutyl-ethyl-carbinyl ethyl malonic ester with urea and sodium ethylate, the corresponding isobutyl-ethyl-carbinyl ethyl barbituric acid may be obtained. This di-substituted barbituric acid on crystallization from dilute alcohol is obtained as a white crystalline solid, insoluble in water and soluble in alcohol and ether, and exhibits hypnotic properties.

*Secondary-heptyl ethyl barbiturates*

All of the above-described barbituric acids are soluble in solutions of alkali-metal hydroxides and ethylates, to form the corresponding alkali-metal barbiturates in solution. The solid salts may be obtained from the alcoholic solutions.

The new di-aliphatic-substituted barbiturates, which may all be represented by Formula 1 with X representing a metal, or ammonium, or an alkyl-substituted ammonium, can perhaps best be prepared from the corresponding di-aliphatic-substituted barbituric acids, as by reaction in a suitable solvent with either the hydroxide or the ethylate of the desired inorganic base, or with ammonia, or with the desired alkyl amine. For instance:

A. Alkali-metal salts: A solution of one molar proportion of the hydroxide or the ethylate of the inorganic base, such as sodium if an alkali-metal salt is desired, is added to a suspension or solution in a suitable solvent (such as water, dilute alcohol, or absolute alcohol) of one molar proportion of any of the herein-contemplated 5,5-di-alphatic-substituted barbituric acids, producing the desired barbiturate in solution. The amount of solvent used is desirably sufficient to dissolve the salt thus produced. The solution is filtered, and is then evaporated, preferably under vacuum at a low temperature, until the salt is obtained in solid form. If the salt is desired in a stable form sufficiently free from contaminants so that clear water solutions thereof suitable for intravenous injection may be obtained, such a salt may be so obtained by the method set forth in my Patent No. 1,856,792, granted May 3, 1932.

*Examples under A*

1. Sodium di-n-propyl-carbinyl ethyl barbiturate: One part by weight of di-n-propyl-carbinyl ethyl barbituric acid is added to enough alcohol to facilitate handling. To this is added a solution of sodium hydroxide, preferably carbonate-free or substantially so, containing $$\frac{40}{254}$$

parts by weight of sodium hydroxide, which is the amount of sodium hydroxide necessary to combine in equal molecular proportions with the di-n-propyl-carbinyl ethyl barbituric acid. This solution is filtered clear, and is then evaporated under vacuum until the sodium di-n-propyl-carbinyl ethyl barbiturate separates out in solid form. The salt as thus obtained in solid form contains a varying amount of moisture.

If it is desired to have a stable salt substantially free from contaminants, the alcohol used for dissolving the barbituric acid is absolute alcohol, and the sodium hydroxide is added as a very concentrated aqueous solution so that the reaction which occurs to form the salt is in a substantially alcoholic solution. By having a substantially alcoholic solution, decomposition of the salt during the process of drying is effectively avoided; and the drying may be carried to a point where materially less than 1% of moisture remains, so that the salt is substantially anhydrous. In this way a stable salt substantially free from decomposition products formed during preparation or drying or on standing is obtained. This salt may be used safely for making aqueous solutions for intravenous injection; for such aqueous solutions, when freshly made, are clear solutions substantially free from haziness.

Sodium di-n-propyl-carbinyl ethyl barbiturate is a white solid, soluble in water and alcohol, and insoluble in ether. The salt is bitter tasting, and its aqueous solution is alkaline in reaction. It is represented by the following formula:

(10) 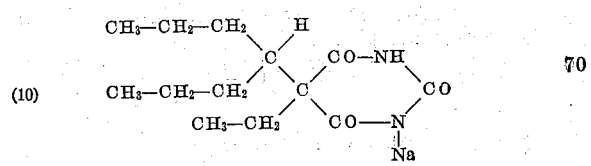

2. Sodium isoamyl-methyl-carbinyl ethyl barbiturate may be prepared analogously, either in hydrated or in stable anhydrous form as desired. It is a white solid, soluble in water and alcohol and insoluble in ether. It is bitter tasting, and its aqueous solution is alkaline in reaction. It is represented by the following formula:

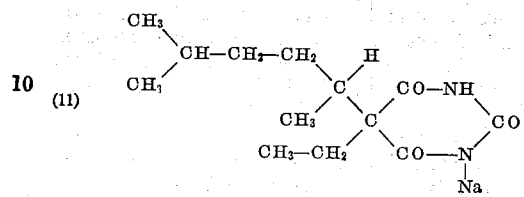
(11)

The sodium salts of the other barbituric acids above described may be prepared analogously, either in hydrated or in stable anhydrous form as desired. They may be represented by formulas in general corresponding to the formulas for the acids, save that one of the nitrogen-joined hydrogen atoms of the acid is replaced by sodium.

B. Ammonium salts: One molar proportion of any of the above-described 5,5-di-aliphatic substituted barbituric acids may be dissolved in or added to somewhat more than a molar proportion of concentrated aqueous ammonia solution, and the resultant ammonium salt crystallizes out or is concentrated to solid form. The formulas of those ammonium salts correspond in general to the formulas for the acids, save that $NH_4$ is substituted for one of the nitrogen-joined hydrogen atoms.

C. Amine salts: One molar proportion of any of the above-described 5,5-di-aliphatic-substituted barbituric acids is added to somewhat more than a molar proportion of an organic base, such as mono- or di-methyl amine or mono- or di-ethyl amine, in aqueous or alcoholic solution if desired or necessary. The amount of liquid used should be sufficient to ensure complete reaction. The resulting alkyl-substituted-ammonium barbiturate crystallizes out or is concentrated to solid form. The formulas of such organic-base barbiturates correspond in general to the formulas for the acids, save that the substituted-ammonium radical, such for instance as the methyl-ammonium radical, $-NH_3-CH_3$ takes the place of one of the nitrogen-joined hydrogen atoms.

The above-described di-aliphatic-substituted barbituric acids and their salts are all of value as sedatives and hypnotics.

I claim as my invention:

1. A barbituric compound which is represented by the following formula:

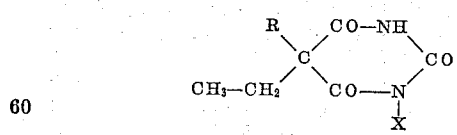

in which R represents a saturated open-chain secondary-aliphatic radical which has seven carbon atoms and in which no two tertiary carbon atoms are directly joined; and X represents either hydrogen, an alkali metal, ammonium, or a mono- or di-alkyl-substituted ammonium.

2. A barbituric acid which is represented by the following formula:

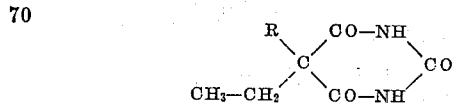

in which R represents a saturated open-chain secondary-aliphatic radical which has seven carbon atoms and in which no two tertiary carbon atoms are directly joined.

3. A sodium barbiturate which is represented by the following formula:

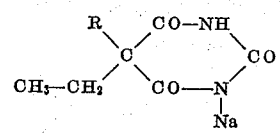

in which R represents a saturated open-chain secondary-aliphatic radical which has seven carbon atoms and in which no two tertiary carbon atoms are directly joined.

4. A barbituric compound which is represented by the following formula:

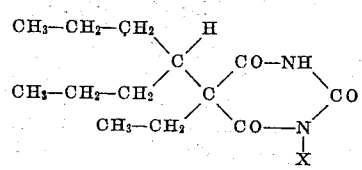

in which X represents either hydrogen, an alkali metal, ammonium, or a mono- or di-alkyl-substituted ammonium.

5. A barbituric compound which is represented by the following formula:

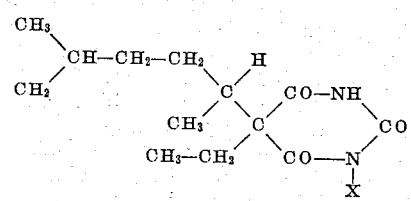

in which X represents either hydrogen, an alkali metal, ammonium, or a mono- or di-alkyl-substituted ammonium.

6. A barbituric acid which is represented by the following formula:

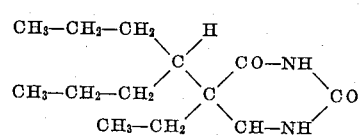

which is a white crystalline solid having hypnotic action, insoluble in water, and soluble in alcohol.

7. A barbituric acid which is represented by the following formula:

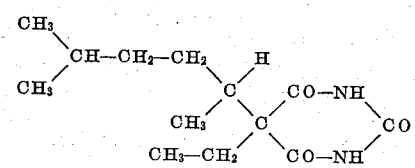

which is a white crystalline solid having hypnotic action, insoluble in water, and soluble in alcohol.

8. A barbituric compound which is represented by the following formula:

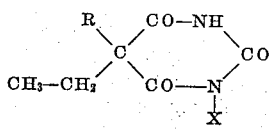

in which R represents a saturated open-chain secondary-aliphatic radical which has seven carbon atoms; and X represents either hydrogen, an alkali metal, ammonium, or a mono- or di-alkyl-substituted ammonium.

9. A barbituric acid which is represented by the following formula:

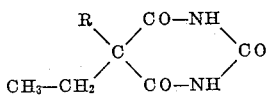

in which R represents a saturated open-chain secondary-aliphatic radical which has seven carbon atoms.

10. A sodium barbiturate which is represented by the following formula:

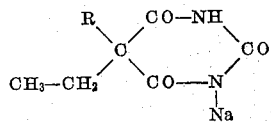

in which R represents a saturated open-chain secondary-aliphatic radical which has seven carbon atoms.

HORACE A. SHONLE.

Certificate of Correction

Patent No. 1,996,629. April 2, 1935.

HORACE A. SHONLE

It is hereby certified that errors appear in the printed specification of the above numbered patent requiring correction as follows: Page 4, first column, line 47, before "takes" insert a *comma*; same page, second column, line 35, claim 5, in the formula, the "$CH_2$" at the lower of the two branches at the left hand end of the upper line should read *$CH_3$*; and line 50, claim 6, in the formula, the "CH" just left of "NH" in the lowermost line should read *CO*; and that the said Letters Patent should be read with these corrections therein that the same may conform to the record of the case in the Patent Office.

Signed and sealed this 14th day of May, A. D. 1935.

[SEAL] LESLIE FRAZER,
*Acting Commissioner of Patents.*